United States Patent
Oshitari et al.

(12)

(10) Patent No.: US 11,228,035 B2
(45) Date of Patent: Jan. 18, 2022

(54) POSITIVE ELECTRODE MATERIAL FOR LITHIUM ION SECONDARY BATTERY, POSITIVE ELECTRODE FOR LITHIUM ION SECONDARY BATTERY, AND LITHIUM ION SECONDARY BATTERY

(71) Applicant: SUMITOMO OSAKA CEMENT CO., LTD., Tokyo (JP)

(72) Inventors: Satoru Oshitari, Chiba (JP); Kouji Oono, Chiba (JP); Tsutomu Nozoe, Chiba (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 17/030,872

(22) Filed: Sep. 24, 2020

(65) Prior Publication Data

US 2021/0296649 A1    Sep. 23, 2021

(30) Foreign Application Priority Data

Mar. 17, 2020 (JP) .............................. JP2020-046887

(51) Int. Cl.
*H01M 4/58* (2010.01)
*H01M 4/36* (2006.01)
(Continued)

(52) U.S. Cl.
CPC ......... *H01M 4/5825* (2013.01); *H01M 4/364* (2013.01); *H01M 4/587* (2013.01);
(Continued)

(58) Field of Classification Search
CPC .... H01M 4/5825; H01M 4/364; H01M 4/587; H01M 10/0525; H01M 2004/021;
(Continued)

(56) References Cited

U.S. PATENT DOCUMENTS

| | | | |
|---|---|---|---|
| 2004/0109822 A1 | 6/2004 | Davis et al. | |
| 2011/0027651 A1* | 2/2011 | Sun ......................... | C01B 33/22 |
| | | | 429/220 |

(Continued)

FOREIGN PATENT DOCUMENTS

| | | |
|---|---|---|
| CA | 3081458 | 5/2019 |
| CN | 105591097 | 5/2016 |

(Continued)

OTHER PUBLICATIONS

JP Office Action issued in JP Patent Appl. No. 2020-046887, dated Sep. 15, 2020.

(Continued)

*Primary Examiner* — Gary D Harris
(74) *Attorney, Agent, or Firm* — Greenblum & Bernstein, P.L.C.

(57) ABSTRACT

A positive electrode material for a lithium ion secondary battery includes an olivine-type phosphate-based compound represented by General Formula $Li_xA_yD_zPO_4$ and carbon, and, in transmission electron microscopic observation of a cross section of a secondary particle that is an agglomerate of primary particles of the olivine-type phosphate-based compound, a 300-point average value of filling rates of the carbon that fills insides of voids having a diameter of 5 nm or larger that are formed by the primary particles is 30 to 70%. A is any one of Co, Mn, Ni, Fe, Cu, and Cr, D is any one of Mg, Ca, Sr, Ba, Ti, Zn, B, Al, Ga, In, Si, Ge, Sc, and Y, and x, y, and z satisfy $0.9 < x < 1.1$, $0 < y \leq 1.0$, $0 \leq z < 1.0$, and $0.9 < y+z < 1.1$.

4 Claims, 1 Drawing Sheet

(51) Int. Cl.
   *H01M 4/587* (2010.01)
   *H01M 10/0525* (2010.01)
   *H01M 4/02* (2006.01)

(52) U.S. Cl.
   CPC .. *H01M 10/0525* (2013.01); *H01M 2004/021* (2013.01); *H01M 2004/028* (2013.01)

(58) Field of Classification Search
   CPC ......... H01M 2004/028; H01M 10/052; H01M 4/362; H01M 4/1397; H01M 4/625; H01M 4/136; H01M 10/058; H01M 10/4235; C01B 25/45; Y02E 60/10
   USPC ........................................................ 429/221
   See application file for complete search history.

(56) References Cited

U.S. PATENT DOCUMENTS

| | | | |
|---|---|---|---|
| 2012/0196185 | A1 | 8/2012 | Kono et al. |
| 2014/0356707 | A1 | 12/2014 | Kwon et al. |
| 2016/0111712 | A1 | 4/2016 | Masataka et al. |
| 2016/0156026 | A1 | 6/2016 | Kitagawa et al. |
| 2017/0092933 | A1 | 3/2017 | Oshitari et al. |
| 2017/0092938 | A1 | 3/2017 | Oono et al. |
| 2017/0237121 | A1 | 8/2017 | Ono et al. |
| 2018/0277838 | A1 | 9/2018 | Yasumiishi et al. |
| 2018/0366720 | A1* | 12/2018 | Chong .................. H01M 4/364 |
| 2019/0103601 | A1 | 4/2019 | Oshitari et al. |
| 2019/0305304 | A1 | 10/2019 | Oshitari et al. |

FOREIGN PATENT DOCUMENTS

| | | |
|---|---|---|
| CN | 105655571 | 6/2016 |
| CN | 106058220 | 10/2016 |
| CN | 107086295 | 8/2017 |
| CN | 109585799 | 4/2019 |
| EP | 2 778 126 | 9/2014 |
| EP | 3026735 | 6/2016 |
| EP | 3206245 | 8/2017 |
| EP | 3462523 | 4/2019 |
| JP | 10-144320 | 5/1998 |
| JP | 2000-223120 | 8/2000 |
| JP | 2005-520290 | 7/2005 |
| JP | 2009-117240 | 5/2009 |
| JP | 2013-080780 | 5/2013 |
| JP | 2013-542559 | 11/2013 |
| JP | 2014-170724 | 9/2014 |
| JP | 2014-232728 | 12/2014 |
| JP | 5822017 | 11/2015 |
| JP | 2016-081806 | 5/2016 |
| JP | 2016-103352 | 6/2016 |
| JP | 2017-069028 | 4/2017 |
| JP | 2017-069041 | 4/2017 |
| JP | 6168218 | 7/2017 |
| JP | 2017-143049 | 8/2017 |
| JP | 6172309 | 8/2017 |
| JP | 2018-037291 | 3/2018 |
| JP | 6288339 | 3/2018 |
| JP | 6399186 | 10/2018 |
| JP | 2019-067594 | 4/2019 |
| KR | 10-2019-0038250 | 4/2019 |
| KR | 10-2020310 | 9/2019 |
| WO | 2011/013652 | 2/2011 |

OTHER PUBLICATIONS

Extended European Search Report issued in EP Patent Application No. 20198079.4, dated Feb. 5, 2021.
Decision to Grant a Patent issued in JP Patent Application No. 2020-046887, dated Jan. 19, 2021, English translation.
Notice of Reasons for Refusal issued in JP Patent Application No. 2020-046887, dated Sep. 15, 2020, English translation.
Office Action issued in CA Patent Application No. 3,094,586, dated Oct. 4, 2021.

* cited by examiner

POSITIVE ELECTRODE MATERIAL FOR LITHIUM ION SECONDARY BATTERY, POSITIVE ELECTRODE FOR LITHIUM ION SECONDARY BATTERY, AND LITHIUM ION SECONDARY BATTERY

CROSS-REFERENCE TO RELATED APPLICATIONS

This application claims the benefit of Japanese Patent Application No. 2020-046887 filed Mar. 17, 2020, the disclosure of which is herein incorporated by reference in its entirety.

BACKGROUND OF THE INVENTION

Field of the Invention

The present invention relates to a positive electrode material for a lithium ion secondary battery, a positive electrode for a lithium ion secondary battery, and a lithium ion secondary battery.

Description of Related Art

Lithium ion secondary batteries have a higher energy density and a higher power density than lead batteries and nickel-hydrogen batteries and are used in a variety of uses such as small-sized electronic devices such as smartphones and the like, domestic backup power supply, electric tools, and the like. In addition, attempts are underway to put high-capacity lithium ion secondary batteries into practical use for recyclable energy storage such as photovoltaic power generation, wind power generation, and the like.

Lithium ion secondary batteries usually include a positive electrode, a negative electrode, an electrolyte, and a separator. As a positive electrode material that constitutes the positive electrode, positive electrode active materials made of lithium-containing metal oxide having properties capable of reversibly intercalating and deintercalating lithium ions such as lithium cobalt oxide ($LiCoO_2$), lithium manganese oxide ($LiMn_2O_4$), lithium iron phosphate ($LiFePO_4$), or the like are used, and studies are underway in order for improvement from a variety of viewpoints such as an increase in the capacities of batteries, the extension of service lives, improvement in safety, cost reduction, and the like (for example, Japanese Laid-open Patent Publication No. 10-144320).

SUMMARY OF THE INVENTION

In a case where an olivine-type phosphate-based compound is used as a positive electrode active material, an attempt has been made in order to obtain favorable characteristics by, for example, miniaturizing primary particles to a specific surface area of approximately 5 to 35 $m^2/g$ and, furthermore, coating the primary particles with carbon. However, due to such miniaturization, there is a tendency that the sizes of voids between the primary particles, which are formed by the primary particles, become narrower than those in a material having coarse primary particles, and there has been room for studies to obtain lithium ion secondary batteries having excellent high input characteristics and excellent cycle characteristics.

Furthermore, a decrease in the tap density and a decrease in the carbon coating filling rate, which result from the expansion of the voids between the primary particles, give rise to a decrease in the electron conductivity, which is likely to cause a decrease in the energy density and a decrease in the charge and discharge capacity.

The present invention has been made in consideration of the above-described circumstances, and an object of the present invention is to provide a lithium ion secondary battery having excellent high input characteristics and excellent cycle characteristics, a positive electrode material for a lithium ion secondary battery and a positive electrode for a lithium ion secondary battery with which the above-described battery can be obtained.

As a result of intensive studies for solving the above-described problem, the present inventors found that the amount of an electrolyte held is adjusted to an amount preferable for charging and discharging by adjusting the filling rate of carbon that occupies voids between the primary particles of an olivine-type phosphate-based compound. The voids are formed by the primary particles.

The present invention was completed based on such a finding.

That is, the present invention provides [1] to [5] below.

[1] A positive electrode material for a lithium ion secondary battery including an olivine-type phosphate-based compound represented by General Formula $Li_xA_yD_zPO_4$ and carbon, in which, in transmission electron microscopic observation of a cross section of a secondary particle that is an agglomerate of primary particles of the olivine-type phosphate-based compound, a 300-point average value of filling rates of the carbon that fills insides of voids having a diameter of 5 nm or larger that are formed by the primary particles is 30 to 70%.

In the general formula, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Ge, Sc, and Y, and x, y, and z satisfy $0.9<x<1.1$, $0<y\leq1.0$, $0\leq z<1.0$, and $0.9<y+z<1.1$.

[2] The positive electrode material for a lithium ion secondary battery according to [1], in which an amount of carbon (c) may be 0.7% to 3.0% by mass, a specific surface area (a) may be 5 to 35 $m^2/g$, and a value (c/a) obtained by dividing the amount of carbon (c) by the specific surface area (a) may be 0.07 to 0.14.

[3] The positive electrode material for a lithium ion secondary battery according to [1] or [2], in which a tap density may be 1.0 to 1.6 $g/cm^3$.

[4] A positive electrode for a lithium ion secondary battery including an electrode current collector and a positive electrode mixture layer formed on the electrode current collector, in which the positive electrode mixture layer contains the positive electrode material for a lithium ion secondary battery according to any one of [1] to [3].

[5] A lithium ion secondary battery having a positive electrode, a negative electrode, and an electrolyte, in which the positive electrode for a lithium ion secondary battery according to [4] is provided as the positive electrode.

According to the present invention, it is possible to provide a lithium ion secondary battery having excellent high input characteristics and excellent cycle characteristics, a positive electrode material for a lithium ion secondary battery and a positive electrode for a lithium ion secondary battery with which the above-described battery can be obtained.

DETAILED DESCRIPTION OF THE INVENTION

Figure 1:
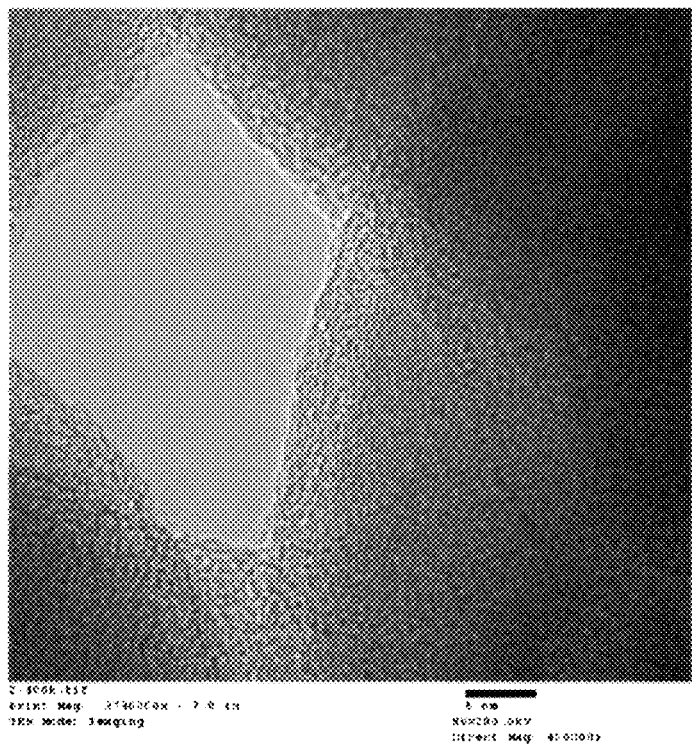
FIG. 1 is a TEM photograph of a positive electrode material for a lithium ion secondary battery in Example 2.

Positive Electrode Material for Lithium Ion Secondary Battery

A positive electrode material for a lithium ion secondary battery of the present embodiment (hereinafter, also simply referred to as "positive electrode material") includes an olivine-type phosphate-based compound represented by General Formula $Li_xA_yD_zPO_4$ and carbon, and, in transmission electron microscopic observation of a cross section of a secondary particle that is an agglomerate of primary particles of the olivine-type phosphate-based compound, a 300-point average value of filling rates of carbon that fills insides of voids having a diameter of 5 nm or larger that are formed by the primary particles is 30 to 70%.

Hereinafter, unless particularly otherwise described, "in transmission electron microscopic observation of a cross section of a secondary particle that is an agglomerate of primary particles of the olivine-type phosphate-based compound, a 300-point average value of filling rates of carbon that fills insides of voids having a diameter of 5 nm or larger that are formed by the primary particles" will be simply referred to as "the carbon filling rate in the present invention".

In the olivine-type phosphate-based compound, part or all of the primary particles or the secondary particles are preferably covered with a carbonaceous film from the viewpoint of improving the high input characteristics and the cycle characteristics, and the voids between the primary particles are filled with carbon. It is considered that the amount of an electrolyte held is adjusted to an amount preferable for charging and discharging by adjusting the amount of carbon that fills voids having a specific shape among the voids. That is, the high input characteristics and the cycle characteristics of the lithium ion secondary battery can be improved by setting the carbon filling rate in the present invention to 30% to 70%.

Olivine-Type Phosphate-Based Compound (Positive Electrode Active Material)

The olivine-type phosphate-based compound that is used in the present embodiment is represented by General Formula $Li_xA_yD_zPO_4$ and functions as a positive electrode active material.

In the general formula, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Ge, Sc, and Y, and x, y, and z satisfy $0.9<x<1.1$, $0<y\leq1.0$, $0\leq z<1.0$, and $0.9<y+z<1.1$.

In the general formula, A and D each may be independently two or more elements, and the general formula may be represented by, for example, a formula such as $Li_xA^1_{y1}A^2_{y2}D^1_{z1}D^2_{z2}D^3_{z3}D^4_{z4}PO_4$. At this time, the sum of $y_1$ and $y_2$ needs to be in the range of y, that is, the range of more than 0 and 1.0 or less, and the sum of $z_1$, $z_2$, $z_3$, and $z_4$ needs to be in the range of z, that is, the range of 0 or more and less than 1.0.

The olivine-type phosphate-based compound is not particularly limited as long as the olivine-type phosphate-based compound has the above-described constitution, but is preferably made of an olivine-structured transition metal lithium phosphate compound.

In General Formula $Li_xA_yD_zPO_4$, A is preferably Co, Mn, Ni, or Fe and more preferably Co, Mn, or Fe. In addition, D is preferably Mg, Ca, Sr, Ba, Ti, Zn, or Al. Containing these elements in the olivine-type phosphate-based compound enables a positive electrode mixture layer to realize a high discharge potential and high safety. In addition, these elements have an abundant amount of resources and are thus preferred as a material to be selected.

The olivine-type phosphate-based compound is also preferably represented by General Formula $LiFe_{x2}Mn_{1-x2-y2}M_{y2}PO_4$ from the viewpoint of a high discharge capacity and a high energy density.

In General Formula $LiFe_{x2}Mn_{1-x2-y2}M_{y2}PO_4$, M is at least one element selected from Mg, Ca, Co, Sr, Ba, Ti, Zn, B, Al, Ga, In, Si, Ge, Sc and Y, $0.05\leq x2\leq1.0$, and $0\leq y2\leq0.14$.

The shape of the olivine-type phosphate-based compound of the present embodiment is preferably a primary particle and a secondary particle, which is an aggregate of the primary particles.

The shape of the primary particle of the olivine-type phosphate-based compound is not particularly limited, but is preferably spherical, particularly, truly spherical. When the primary particle has a spherical shape, it is possible to decrease the amount of a solvent used at the time of preparing a paste for forming a positive electrode using the positive electrode material of the present embodiment, and it becomes easy to apply the paste for forming a positive electrode to a current collector. The paste for forming a positive electrode can be prepared by, for example, mixing the positive electrode material of the present embodiment, a binder resin (a binder), and a solvent.

The primary particle and the secondary particle of the olivine-type phosphate-based compound will be collectively referred to as the positive electrode active material particle.

Carbonaceous Film

Carbon that the positive electrode material of the present embodiment contains is preferably contained in the positive electrode material as a carbonaceous film that coats positive electrode active material particles.

The carbonaceous film is a pyrolytic carbonaceous film that is obtained by carbonizing an organic substance that serves as a raw material of the carbonaceous film.

The organic substance is not particularly limited as long as the organic substance is capable of forming the carbonaceous film on the surfaces of the positive electrode active material particles, and examples of the organic substance include polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, phenol, phenolic resins, glucose, fructose, galactose, mannose, maltose, sucrose, lactose, glycogen, pectin, alginic acid, glucomannan, chitin, hyaluronic acid, chondroitin, agarose, polyether, polyvalent alcohol, and the like. Examples of the polyvalent alcohol include polyethylene glycol, polypropylene glycol, polyglycerin, glycerin, and the like. These organic substances may be used singly or two or more organic substances may be mixed and used.

Carbon Filling Rate

In the positive electrode material of the present embodiment, the carbon filling rate in the present invention is 30% to 70%.

When the carbon filling rate in the present invention is less than 30%, the amount of an electrolyte that infiltrates voids between the primary particles increases, and the amount of the electrolyte held in the positive electrode material increases. As a result, the electrolyte that is originally supposed to move to the separator and the negative electrode becomes deficient, Li ion migration around the separator and the negative electrode becomes slow, and the battery reaction is limited, which deteriorates the cycle characteristics and the input characteristics.

On the other hand, when the carbon filling rate in the present invention exceeds 70%, since the voids between the primary particles become narrow, and the infiltration of the electrolyte into the voids is hindered, the amount of the electrolyte held in the positive electrode material decreases. As a result, the migration of Li ions around the positive electrode material becomes slow, and the battery reaction is limited, which deteriorates the cycle characteristics and the input characteristics of the battery.

The carbon filling rate in the present invention is preferably 32% to 67%, more preferably 34% to 65%, still more preferably 37% to 62%, and far still more preferably 40% to 60% from the viewpoint of further improving the high input characteristics and the cycle characteristics of the lithium ion secondary battery.

The carbon filling rate in the present invention can be obtained by observing the voids between the primary particles of the olivine-type phosphate-based compound contained in the positive electrode material with a transmission electron microscope (TEM). As described above, the olivine-type phosphate-based compound (positive electrode active material) is preferably covered with the carbonaceous film, and, with a transmission electron microscope, usually, the positive electrode active material particles coated with the carbonaceous film (hereinafter, also referred to as "carbonaceous coated positive electrode active material particles") are observed.

Specifically, a thin film sample is produced by processing the cross section of the secondary particle of the olivine-type phosphate-based compound, and the carbon filling state in a void between the primary particles is observed. In a void having a diameter of 5 nm or more, the carbon filling rate is calculated from the area ratio between the void and carbon in an observation image. The average value of the carbon filling rates in 300 voids having a diameter of 5 nm or more is calculated and regarded as the carbon filling rate in the present invention.

In the positive electrode material (preferably the carbonaceous coated positive electrode active material particles) in the present embodiment, the amount of carbon (c) is preferably 0.7% to 3.0% by mass.

When the amount of carbon (c) of the positive electrode material is 0.7% by mass or more, since the distance between carbon atoms is shortened, and a conduction path is likely to be easily formed, the cycle characteristics of the lithium ion secondary battery are likely to improve. In addition, when the amount of carbon (c) of the positive electrode material is 3.0% by mass or less, the voids between the primary particles of the olivine-type phosphate-based compound do not easily become narrow, it is possible to increase the amount of the electrolyte held in the positive electrode material, and the input characteristics are likely to improve.

From the viewpoint of the balance between the input characteristics and the cycle characteristics, the amount of carbon (c) of the positive electrode material is more preferably 1.0% to 2.7% by mass and still more preferably 1.2% to 2.5% by mass.

The amount of carbon can be measured using a carbon analyzer (for example, manufactured by Horiba, Ltd., model number: EMIA-220V).

In the positive electrode material (preferably the carbonaceous coated positive electrode active material particles) in the present embodiment, the specific surface area (a) is preferably 5 to 35 $m^2/g$.

When the specific surface area (a) of the positive electrode material is 5 $m^2/g$ or more, the particle diameters of the primary particles of the olivine-type phosphate-based compound becomes small, and it is possible to increase the capacity during operation at a high current or operation at a low temperature by shortening the time taken for the migration of lithium ions and electrons.

When the specific surface area (a) of the positive electrode material is 35 $m^2/g$ or less, it is possible to suppress the elution of metal.

From the viewpoint of the balance between the input characteristics and the cycle characteristics, the specific surface area (a) of the positive electrode material is more preferably 7 to 30 $m^2/g$ and still more preferably 9 to 25 $m^2/g$.

The specific surface area can be measured by a BET method through nitrogen ($N_2$) adsorption using a specific surface area meter (for example, manufactured by Microtrac BEL Corp., trade name: BELSORP-mini).

The value (c/a) obtained by dividing the amount of carbon (c) of the positive electrode material (preferably the carbonaceous coated positive electrode active material particles) in the present embodiment by the specific surface area (a), in other words, the amount of carbon per unit specific surface area of the positive electrode material is preferably 0.07 to 0.14. The unit of c/a is % by mass·$g/m^2$.

When c/a is 0.07 or more, the carbonaceous film is capable of exhibiting sufficient electron conductivity. In addition, when c/a is 0.14 or less, the amount of fine crystals of graphite having a lamellar structure that is generated in the carbonaceous film becomes small, and the fine crystals of graphite are less likely to build a steric barrier during the diffusion of lithium ions in the carbonaceous film. Therefore, it is possible to suppress an increase in the lithium ion migration resistance.

From the above-described viewpoint, c/a is more preferably 0.09 to 0.13 and still more preferably 0.10 to 0.12.

The tap density of the positive electrode material (preferably the carbonaceous coated positive electrode active material particles) in the present embodiment is preferably 1.0 to 1.6 $g/cm^3$.

When the tap density of the positive electrode material is 1.0 $g/cm^3$ or more, the contact area between the positive electrode active material and the electrolyte does not become too large, and it is possible to suppress the amount of metal eluted from the positive electrode active material. When the tap density of the positive electrode material is 1.6 $g/cm^3$ or less, the contact area between the positive electrode active material and the electrolyte becomes large, the intercalation and deintercalation of lithium ions into and from the positive electrode active material become easy, and it is possible to increase the capacity.

From the above-described viewpoint, the tap density of the positive electrode material is more preferably 1.1 to 1.5 and still more preferably 1.2 to 1.5.

The tap density can be measured using a method according to test methods for bulk density of fine ceramic powder of JIS R 1628:1997.

The average particle diameter of the primary particles of the positive electrode active material particles coated with the carbonaceous film (carbonaceous coated positive electrode active material particles) is preferably 50 nm or more, more preferably 70 nm or more, and still more preferably 100 nm or more. The average particle diameter is preferably 500 nm or less, more preferably 450 nm or less, and still more preferably 400 nm or less. When the average particle diameter of the primary particles is 50 nm or more, it is possible to suppress an increase in the amount of carbon attributed to an increase in the specific surface area of the positive electrode material, and thus it is possible to suppress a decrease in the charge and discharge capacity of the lithium ion secondary battery. When the average particle diameter of the primary particles is 500 nm or less, it is possible to shorten the migration time of lithium ions or the migration time of electrons, which migrate in the positive electrode material. Therefore, it is possible to suppress the deterioration of the output characteristics attributed to an increase in the internal resistance of the lithium ion secondary battery.

Here, the average particle diameter of the primary particles refers to the number-average particle diameter. The average particle diameter of the primary particles can be obtained by number-averaging the particle diameters of 200 or more particles measured by scanning electron microscopic (SEM) observation.

The average particle diameter of the secondary particles of the carbonaceous coated positive electrode active material particles is preferably 0.5 μm or more, more preferably 1.0 μm or more, and still more preferably 1.5 μm or more. In addition, the average particle diameter of the secondary particles of the carbonaceous coated positive electrode active material particles is preferably 20 μm or less, more preferably 18 μm or less, and still more preferably 15 μm or less. When the average particle diameter of the secondary particles is 0.5 μm or more, it is possible to suppress the necessity of a large amount of a conductive auxiliary agent and a binder at the time of preparing a positive electrode material paste for a lithium ion secondary battery by mixing the positive electrode material, the conductive auxiliary agent, a binder resin (the binder), and a solvent. Therefore, it is possible to increase the battery capacity of the lithium ion secondary battery per unit mass in the positive electrode mixture layer of the positive electrode of the lithium ion secondary battery. When the average particle diameter of the secondary particles is 20 μm or less, it is possible to enhance the dispersibility and uniformity of the conductive auxiliary agent or the binder in the positive electrode mixture layer of the positive electrode of the lithium ion secondary battery. As a result, the discharge capacity at the high-speed charge and discharge of the lithium ion secondary battery increases.

Here, the average particle diameter of the secondary particles refers to the volume-average particle diameter. The average particle diameter of the secondary particles can be measured using a laser diffraction and scattering particle size distribution measurement instrument or the like.

The thickness (average value) of the carbonaceous film that coats the positive electrode active material particles is preferably 1.0 nm or more and more preferably 1.4 nm or more. In addition, the thickness of the carbonaceous film is preferably 10.0 nm or less and more preferably 7.0 nm or less. When the thickness of the carbonaceous film is 1.0 nm or more, it is possible to suppress an increase in the sum of the migration resistances of electrons in the carbonaceous film. Therefore, it is possible to suppress an increase in the internal resistance of the lithium ion secondary battery and to prevent voltage drop at a high charge-discharge rate. When the thickness of the carbonaceous film is 10.0 nm or less, it is possible to suppress the formation of a steric barrier that inhibits the diffusion of lithium ions in the carbonaceous film, which decreases the migration resistance of lithium ions. As a result, an increase in the internal resistance of the battery is suppressed, and it is possible to prevent voltage drop at a high charge-discharge rate.

The coating ratio of the carbonaceous film to the positive electrode active material particles is preferably 60% or more and more preferably 80% or more. When the coating ratio of the carbonaceous film is 60% or more, the coating effect of the carbonaceous film can be sufficiently obtained.

The coating ratio of the carbonaceous film can be obtained by observing the particles using a transmission electron microscope (TEM), an energy dispersive X-ray microanalyzer (EDX), or the like, calculating the proportions of parts that cover the particle surfaces, and obtaining the average value thereof.

The density of the carbonaceous film, which is calculated using a carbon component constituting the carbonaceous film, is preferably 0.3 $g/cm^3$ or more and more preferably 0.4 $g/cm^3$ or more. In addition, the density of the carbonaceous film is preferably 2.0 $g/cm^3$ or less and more preferably 1.8 $g/cm^3$ or less. The density of the carbonaceous film, which is calculated using the carbon component constituting the carbonaceous film, refers to the mass of the carbonaceous film per unit volume in a case where the carbonaceous film is formed of carbon alone.

When the density of the carbonaceous film is 0.3 $g/cm^3$ or more, the carbonaceous film is capable of exhibiting a sufficient electron conductivity. When the density of the carbonaceous film is 2.0 $g/cm^3$ or less, since the amount of the fine crystals of graphite having a lamellar structure in the carbonaceous film is small, the fine crystals of graphite do not generate any steric barrier during the diffusion of lithium ions in the carbonaceous film. Therefore, the lithium ion migration resistance does not increase. As a result, there is no case where the internal resistance of the lithium ion secondary battery increases, and the voltage of the lithium ion secondary battery at a high charge-discharge rate does not drop.

Method for Manufacturing Positive Electrode Material for Lithium Ion Secondary Battery The method for manufacturing a positive electrode material for a lithium ion secondary battery of the present embodiment is not particularly limited. The method has, for example, a step (A) of obtaining positive electrode active material particles, a step (B) of adding an organic compound to the positive electrode active material particles obtained in the step (A) to prepare a mixture, and a step (C) of putting the mixture into a calcination capsule and calcinating the mixture.

Step (A)

In the step (A), the method for manufacturing the positive electrode active material particles is not particularly limited, and, for example, a conventional method such as a solid phase method, a liquid phase method, a gas phase method, or the like can be used. Examples of $Li_xA_yD_zPO_4$ obtained using the above-described method include particulate $Li_xA_yD_zPO_4$ (hereinafter, referred to as "$Li_xA_yD_zPO_4$ particles" in some cases).

The $Li_xA_yD_zPO_4$ particles can be obtained by, for example, hydrothermally synthesizing a slurry-form mixture that is obtained by mixing a Li source, an A source, a P source, water, and, as necessary, a D source. According to the hydrothermal synthesis, $Li_xA_yD_zPO_4$ is generated as a precipitate in water. The obtained precipitate may be the precursor of $Li_xA_yD_zPO_4$. In this case, the precursor of $Li_xA_yD_zPO_4$ is calcinated to obtain the target $Li_xA_yD_zPO_4$ particles.

A pressure-resistant airtight container is preferably used in the hydrothermal synthesis.

As the reaction conditions of the hydrothermal synthesis, for example, the heating temperature is preferably 110° C. or higher and 200° C. or lower, more preferably 115° C. or higher and 195° C. or lower, and still more preferably 120° C. or higher and 190° C. or lower. When the heating temperature is set in the above-described range, it is possible to set the specific surface area of the positive electrode active material particles in the above-described range.

In addition, the reaction time is preferably 20 minutes or longer and 169 hours or shorter, more preferably 30 minutes or longer and 24 hours or shorter, and still more preferably one hour or longer and 10 hours or shorter. Furthermore, the pressure during the reaction is preferably 0.1 MPa or higher and 22 MPa or lower and more preferably 0.1 MPa or higher and 17 MPa or lower.

The molar ratio (Li:A:D:P) among the Li source, the A source, the D source, and the P source is preferably 2.5 to 4.0:0 to 1.0:0 to 1.0:0.9 to 1.15 and more preferably 2.8 to 3.5:0 to 1.0:0 to 1.0:0.95 to 1.1.

Here, as the Li source, for example, at least one element selected from the group consisting of hydroxides such as lithium hydroxide (LiOH) and the like; inorganic lithium acid salts such as lithium carbonate ($Li_2CO_3$), lithium chloride (LiCl), lithium nitrate ($LiNO_3$), lithium phosphate ($Li_3PO_4$), lithium hydrogen phosphate ($Li_2HPO_4$), lithium dihydrogen phosphate ($LiH_2PO_4$), and the like; organic lithium acid salts such as lithium acetate ($LiCH_3COO$), lithium oxalate (($COOLi)_2$), and the like, and hydrates thereof is preferably used.

Lithium phosphate ($Li_3PO_4$) can be used as both the Li source and the P source.

Examples of the A source include chlorides, carboxylates, hydrosulfates, and the like that include at least one element selected from the group consisting of Co, Mn, Ni, Fe, Cu, and Cr. For example, in a case where A in $Li_{x1}A_{y1}D_{z1}PO_4$ is Fe, examples of the Fe source include iron compounds such as iron (II) chloride ($FeCl_2$), iron(II) sulfate ($FeSO_4$), iron (II) acetate ($Fe(CH_3COO)_2$), and the like and hydrates thereof, trivalent iron compounds such as iron (III) nitrate ($Fe(NO_3)_3$), iron(III) chloride ($FeCl_3$), iron (III) citrate ($FeC_6H_5O_7$), and the like, lithium iron phosphate, and the like.

Examples of the D source include chlorides, carboxylates, hydrosulfates, and the like which include at least one element selected from the group consisting of Mg, Ca, Sr, Ba, Ti, Zn, B, Al, Ga, In, Si, Ge, Sc, and Y. For example, in a case where D in $Li_{x1}A_{y1}D_{z1}PO_4$ is Ca, examples of the Ca source include calcium (II) hydroxide ($Ca(OH)_2$), calcium (II) chloride ($CaCl_2$), calcium (II) sulfate ($CaSO_4$), calcium (II) nitrate ($Ca(NO_3)_2$), calcium (II) acetate ($Ca(CH_3COO)_2$), hydrates thereof, and the like.

Examples of the P source include phosphoric acid compounds such as phosphoric acid ($H_3PO_4$), ammonium dihydrogen phosphate ($NH_4H_2PO_4$), diammonium phosphate (($NH_4)_2HPO_4$), and the like. Among these, as the P source, at least one element selected from the group consisting of phosphoric acid, ammonium dihydrogen phosphate, and diammonium phosphate is preferably used.

Step (B)

In the step (B), an organic compound is added to the positive electrode active material particles obtained in the step (A) to prepare a mixture.

First, the organic compound is added to the positive electrode active material particles, and then a solvent is added thereto.

The amount of the organic compound blended into the positive electrode active material particles is preferably 0.15 parts by mass or more and 15 parts by mass or less and more preferably 0.45 parts by mass or more and 4.5 parts by mass or less with respect to 100 parts by mass of the positive electrode active material particles when the total mass of the organic compound is converted to a carbon element.

When the amount of the organic compound blended into the positive electrode active material particles is 0.15 parts by mass or more, it is possible to set the coating ratio of the carbonaceous film that is generated by a heat treatment of the organic compound to the surfaces of the positive electrode active material particles to 80% or more. Therefore, it is possible to improve the high input characteristic and the cycle characteristic of the lithium ion secondary battery. When the amount of the organic compound blended into the positive electrode active material particles is 15 parts by mass or less, it is possible to suppress a decrease in the capacity of the lithium ion secondary battery caused by a relative decrease in the blending ratio of the positive electrode active material particles. In addition, when the amount of the organic compound blended into the positive electrode active material particles is 15 parts by mass or less, it is possible to suppress an increase in the bulk density of the positive electrode active material particles caused by the excessive support of the carbonaceous film by the positive electrode active material particles. When an increase in the bulk density of the positive electrode active material particles is suppressed, it is possible to suppress a decrease in the electrode density and a decrease in the capacity of the lithium ion secondary battery per unit volume.

As the organic compound that is used to prepare the mixture, the above-described compounds can be used.

Here, when a low-molecular-weight organic compound such as sucrose, lactose, or the like is used as the organic compound, it becomes easy to uniformly form the carbonaceous film on the surfaces of the primary particles of the positive electrode material, but there is a tendency that the degree of carbonization of the carbonaceous film that is obtained by pyrolysis decreases, and it is difficult to form a carbonaceous film capable of sufficiently decreasing the resistance. In addition, the use of the above-described low-molecular-weight organic compound increases the amount of micropores in the carbonaceous film and increases the ratio of the micropores to all pores. On the other hand, when a high-molecular-weight organic compound such as polyvinyl alcohol, polyvinyl pyrrolidone, or the like or an organic compound having a benzene ring structure such as a phenolic resin or the like is used, there is a tendency that the degree of carbonization of the carbonaceous film that is obtained by pyrolysis increases, and a sufficient decrease in resistance can be achieved. However, there is a tendency that it becomes difficult to uniformly form the carbonaceous film on the surfaces of the primary particles of the positive electrode material, and there is a problem in that it is difficult to sufficiently decrease the resistance of the positive electrode material or the like. In addition, the use of the high-molecular-weight organic compound or the organic compound having a benzene ring structure decreases the amount of micropores in the carbonaceous film and decreases the ratio of the micropores to all pores.

Therefore, it is preferable to use an appropriate mixture of the low-molecular-weight organic compound and the high-molecular-weight organic compound or the organic compound having a benzene ring structure.

Particularly, the low-molecular-weight organic compound is preferably used in a powder form since it is easy to mix the positive electrode active material particles and the organic compound, and it is possible to obtain a positive electrode material in which the carbonaceous film is uniformly formed on the surfaces of the primary particles of the positive electrode active material particles. In addition, unlike the high-molecular-weight organic compound, the low-molecular-weight organic compound easily dissolves in a solution and does not require any prior dissolution operation or the like, and thus it is possible to decrease the number of operation steps or reduce costs for the dissolution operation.

When the solvent is added to the positive electrode active material particles, an adjustment is carried out such that the solid content of the solvent preferably reaches 10% to 60% by mass, more preferably reaches 15% to 55% by mass, and still more preferably reaches 25% to 50% by mass. When the solid content is set in the above-described range, it is possible to set the tap density of a positive electrode material to be obtained in the above-described range.

Examples of the solvent include water; alcohols such as methanol, ethanol, 1-propanol, 2-propanol (isopropyl alcohol: IPA), butanol, pentanol, hexanol, octanol, diacetone alcohol, and the like; esters such as ethyl acetate, butyl acetate, ethyl lactate, propylene glycol monomethyl ether acetate, propylene glycol monoethyl ether acetate, γ-butyrolactone, and the like; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, diethylene glycol monoethyl ether, and the like; ketones such as acetone, methyl ethyl ketone (MEK), methyl isobutyl ketone (MIBK), acetyl acetone, cyclohexanone, and the like; amides such as dimethyl formamide, N,N-dimethylacetoacetamide, N-methyl pyrrolidone, and the like; glycols such as ethylene glycol, diethylene glycol, propylene glycol, and the like, and the like. These solvents may be used singly or two or more solvents may be mixed and used. Among these solvents, a preferred solvent is water.

A dispersant may be added thereto as necessary.

The method for dispersing the positive electrode active material particles and the organic compound in the solvent is not particularly limited as long as the positive electrode active material particles uniformly disperse and the organic compound dissolves or disperses. Examples of a device that is used for the above-described dispersion include medium stirring-type dispersion devices that stir medium particles at a high rate such as a planetary ball mill, an oscillation ball mill, a bead mill, a paint shaker, an attritor, and the like.

The granulated body of the mixture may be generated by spraying and drying the mixture in a high-temperature atmosphere, for example, the atmosphere at 110° C. or higher and 200° C. or lower using a spray-pyrolysis method.

In the spray-pyrolysis method, in order to generate a substantially spherical granulated body by rapidly drying the mixture, the particle diameter of a liquid droplet during the spraying is preferably 0.01 μm or more and 100 μm or less.

Step (C)

In the step (C), the mixture obtained in the step (B) is put into a calcination capsule and is calcinated.

As the calcination capsule, for example, a calcination capsule made of a substance having excellent thermal conductivity such as carbon or the like is preferably used.

The calcination temperature is preferably 630° C. or higher and 790° C. or lower and more preferably 680° C. or higher and 770° C. or lower.

When the calcination temperature is 630° C. or higher, the decomposition and reaction of the organic compound sufficiently proceed, and it is possible to sufficiently carbonize the organic compound. As a result, it is possible to form a low-resistance carbonaceous film on the obtained positive electrode material. When the calcination temperature is 790° C. or lower, grain growth in the positive electrode material does not proceed, and it is possible to maintain a sufficiently large specific surface area. As a result, the discharge capacity at a high charge-discharge rate increases in a case where a lithium ion secondary battery is formed, and it is possible to realize sufficient charge and discharge rate performance.

The calcination time needs to be long enough for the organic compound to be sufficiently carbonized. The calcination time is not particularly limited and is, for example, 0.1 hours or longer and 100 hours or shorter.

The calcination atmosphere is preferably an inert atmosphere filled with an inert gas such as nitrogen ($N_2$), argon (Ar), or the like or a reducing atmosphere including a reducing gas such as hydrogen ($H_2$) or the like. In a case where it is necessary to further suppress the oxidation of the mixture, the calcination atmosphere is more preferably a reducing atmosphere.

The calcination in the step (C) causes the decomposition and reaction of the organic compound, thereby generating carbon. In addition, this carbon is attached to the surfaces of the positive electrode active material particles to turn into the carbonaceous film. Therefore, the surfaces of the positive electrode active material particles are covered with the carbonaceous film.

In the present embodiment, in the step (C), it is preferable to add a thermal conduction auxiliary substance having a higher thermal conductivity than the positive electrode active material particles to the mixture and then calcinate the mixture. In such a case, it is possible to make the temperature distribution in the calcination capsule during calcination more uniform. As a result, it is possible to suppress the generation of a portion in which the organic compound is not sufficiently carbonized due to temperature unevenness in the calcination capsule or the generation of a portion in which the positive electrode active material particles are reduced by carbon.

The thermal conduction auxiliary substance is not particularly limited as long as the thermal conduction auxiliary substance has a higher thermal conductivity than the positive electrode active material particles, but is preferably a substance that does not easily react with the positive electrode active material particles. This is because, when the thermal conduction auxiliary substance reacts with the positive electrode active material particles, there is a concern that the battery activity of the positive electrode active material particles to be obtained after the calcination may be impaired or there is a concern that it may become impossible to collect and reuse the thermal conduction auxiliary substance after the calcination.

Examples of the thermal conduction auxiliary substance include carbonaceous materials, alumina-based ceramic, magnesia-based ceramic, zirconia-based ceramic, silica-based ceramic, calcia-based ceramic, aluminum nitride, and the like. These thermal conduction auxiliary substances may be used singly or two or more thermal conduction auxiliary substances may be mixed and used.

The thermal conduction auxiliary substance is preferably a carbonaceous material, and examples of the carbonaceous material include graphite, acetylene black (AB), vapor-grown carbon fiber (VGCF), carbon nanotube (CNT), graphene, and the like. These thermal conduction auxiliary substances may be used singly or two or more carbonaceous materials may be mixed and used. Among these carbonaceous materials, graphite is more preferred as the thermal conduction auxiliary substance.

The dimensions of the thermal conduction auxiliary substance are not particularly limited. However, from the viewpoint of the thermal conduction efficiency, due to the capability of making the temperature distribution in the calcination capsule sufficiently uniform and the purpose of decreasing the amount of the thermal conduction auxiliary substance added, the average length of the thermal conduction auxiliary substance in the longitudinal direction is preferably 1 mm or more and 100 mm or less and more preferably 5 mm or more and 30 mm or less. In addition, when the average length of the thermal conduction auxiliary substance in the longitudinal direction is 1 mm or more and 100 mm or less, it becomes easy to separate the thermal conduction auxiliary substance from the positive electrode material using a sieve.

In addition, the thermal conduction auxiliary substance preferably has a greater specific weight than the positive electrode material since the thermal conduction auxiliary substance is easily separated using an air flow-type classifier or the like.

The amount of the thermal conduction auxiliary substance added is also affected by the dimensions of the thermal conduction auxiliary substance. In a case where the content of the mixture is set to 100% by volume, the amount of the thermal conduction auxiliary substance added is preferably 1% by volume or more and 50% by volume or less and more preferably 5% by volume or more and 30% by volume or less. When the amount of the thermal conduction auxiliary substance added is 1% by volume or more, it is possible to make the temperature distribution in the calcination capsule sufficiently uniform. When the amount of the thermal conduction auxiliary substance added is 50% by volume or less, it is possible to suppress a decrease in the amount of the positive electrode active material particles and the organic compound, which are calcinated in the calcination capsule.

After the calcination, it is preferable to pass the mixture of the thermal conduction auxiliary substance and the positive electrode material through a sieve or the like and to separate the thermal conduction auxiliary substance and the positive electrode material.

Positive Electrode for Lithium Ion Secondary Battery

A positive electrode for a lithium ion secondary battery of the present embodiment is a positive electrode for a lithium ion secondary battery including an electrode current collector and a positive electrode mixture layer formed on the electrode current collector. The positive electrode mixture layer contains the positive electrode material of the present embodiment.

Since the positive electrode for a lithium ion secondary battery of the present embodiment contains the positive electrode material for a lithium ion secondary battery of the present embodiment, a lithium ion secondary battery for which the positive electrode for a lithium ion secondary battery of the present embodiment is used is excellent in terms of the high input characteristics and the cycle characteristics.

Hereinafter, the positive electrode for a lithium ion secondary battery will be simply referred to as "positive electrode" in some cases.

In order to produce the positive electrode, the positive electrode material, a binder made of a binder resin, and a solvent are mixed together, thereby preparing a coating material for forming the positive electrode or a paste for forming the positive electrode. At this time, a conductive auxiliary agent such as carbon black, acetylene black, graphite, ketjen black, natural graphite, artificial graphite, or the like may be added thereto as necessary.

As the binder, that is, the binder resin, for example, a polytetrafluoroethylene (PTFE) resin, a polyvinylidene fluoride (PVdF) resin, fluorine rubber, or the like is preferably used.

The blending ratio between the positive electrode material and the binder resin is not particularly limited. However, for example, the content of the binder resin is set to 1 part by mass to 30 parts by mass and preferably set to 3 parts by mass to 20 parts by mass with respect to 100 parts by mass of the positive electrode material.

The solvent that is used for the coating material for forming the positive electrode or the paste for forming the positive electrode may be appropriately selected in accordance with properties of the binder resin.

Examples of the solvent include water, alcohols such as methanol, ethanol, 1-propanol, 2-propanol (isopropyl alcohol: IPA), butanol, pentanol, hexanol, octanol, diacetone alcohol, and the like, esters such as ethyl acetate, butyl acetate, ethyl lactate, propylene glycol monomethyl ether acetate, propylene glycol monoethyl ether acetate, γ-butyrolactone, and the like, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, diethylene glycol monoethyl ether, and the like, ketones such as acetone, methyl ethyl ketone (MEK), methyl isobutyl ketone (MIBK), acetylacetone, cyclohexanone, and the like, amides such as dimethyl formamide, N,N-dimethylacetoacetamide, N-methylpyrrolidone, and the like, glycols such as ethylene glycol, diethylene glycol, propylene glycol, and the like, and the like. These solvents may be used singly or two or more solvents may be mixed and used.

Next, the coating material for forming the positive electrode or the paste for forming the positive electrode is applied to one main surface of the electrode current collector to form a coated film. Next, this coated film is dried to obtain an electrode current collector having the coated film formed on one main surface. The coated film is made of the mixture containing the positive electrode material and the binder. After that, the coated film is pressurized, bonded by pressure, and dried to produce a positive electrode having a positive electrode mixture layer on one main surface of the electrode current collector.

More specifically, for example, the coating material for forming the positive electrode or the paste for forming the positive electrode is applied to one surface of an aluminum foil. Next, the coated film is dried to obtain an aluminum foil having the coated film formed on one surface. The coated film is made of the mixture containing the positive electrode material and the binder. Next, the coated film is pressurized, bonded by pressure, and dried, thereby producing a current collector (positive electrode) having a positive electrode mixture layer on one surface of the aluminum foil.

A positive electrode with which a lithium ion secondary battery having excellent high input characteristics and excellent cycle characteristics can be obtained can be produced in the above-described manner.

Lithium Ion Secondary Battery

A lithium ion secondary battery of the present embodiment is a lithium ion secondary battery having a positive electrode, a negative electrode, and an electrolyte. The lithium ion secondary battery includes the positive electrode for a lithium ion secondary battery of the present embodiment as the positive electrode.

The lithium ion secondary battery of the present embodiment is not limited to the above-described constitution and may further include, for example, a separator.

Negative Electrode

Examples of the negative electrode include negative electrodes including a negative electrode material such as metallic Li, a carbon material such as natural graphite, hard carbon, or the like, a Li alloy, $Li_4Ti_5O_{12}$, $Si(Li_{4.4}Si)$, or the like.

Electrolyte

The electrolyte is not particularly limited, but is preferably a non-aqueous electrolyte. Examples of the non-aqueous electrolyte include electrolytes obtained by mixing ethylene carbonate (EC) and ethyl methyl carbonate (EMC) such that the volume ratio reaches 1:1 and dissolving lithium hexafluorophosphate ($LiPF_6$) in the obtained solvent mixture such that the concentration reaches 1 mol/$dm^3$.

Separator

The positive electrode of the present embodiment and the negative electrode can be made to face each other through a separator. As the separator, it is possible to use, for example, porous propylene.

In addition, instead of the non-aqueous electrolyte and the separator, a solid electrolyte may be used.

In the lithium ion secondary battery of the present embodiment, since the positive electrode has the positive electrode mixture layer containing the positive electrode material for a lithium ion secondary battery of the present embodiment, Li ion migration is excellent in the periphery of any battery constituent member, and the high input characteristics and the cycle characteristics are excellent. Therefore, the lithium ion secondary battery is preferably used in batteries for driving electric vehicles, batteries for driving hybrid vehicles, and the like.

EXAMPLES

Hereinafter, the present invention will be specifically described using examples and comparative examples. It should be noted that the present invention is not limited to forms described in the examples.

Manufacturing of Positive Electrode Material for Lithium Ion Secondary Battery

Example 1

An olivine-type compound $LiFePO_4$ was manufactured as described below. $Li_3PO_4$ was used as a Li source and a P source, a $FeSO_4$ aqueous solution was used as a Fe source, and these were mixed with each other such that the molar ratio (Li:Fe:P) reached 3:1:1, thereby preparing 2.2 L of a raw material slurry A1.

Next, the raw material slurry A1 was put into a pressure resistant vessel.

After that, a heating reaction of the raw material slurry A1 was caused at 175° C. for 16 hours to carry out hydrothermal synthesis. The pressure in the pressure resistant vessel at this time was 0.8 MPa.

After the reaction, the atmosphere in the pressure resistant vessel was cooled to room temperature to obtain a precipitate of a reaction product in a cake state.

This precipitate was sufficiently washed with distilled water a plurality of times, and the water content was maintained at 40% to prevent the precipitate from being dried, thereby producing a cake-like substance.

This cake-like substance was dried in a vacuum at 70° C. for two hours and with respect to 95% by mass of the obtained $LiFePO_4$ (LFP) particles, an aqueous polyacrylic acid solution in a solid content of 4.5% by mass as a first carbon source and a water-dispersible phenolic resin in a solid content of 0.5% by mass as a second carbon source were dispersed in a water solvent to obtain a raw material slurry β1.

After the raw material slurry β1 was dried and granulated, a heat treatment was carried out at 735° C. for two hours using a rotary kiln manufactured by Chugai Engineering Co., Ltd. Therefore, the surfaces of particles were coated with a carbonaceous film, and a positive electrode material for a lithium ion secondary battery of Example 1 was obtained.

Example 2

A raw material slurry β2 was obtained by, in Example 1, dispersing, with respect to 95% by mass of the obtained $LiFePO_4$ (LFP) particles, an aqueous polyacrylic acid solution in a solid content of 3.5% by mass as a first carbon source and a water-dispersible phenolic resin in a solid content of 1.5% by mass as a second carbon source in a water solvent.

A positive electrode material for a lithium ion secondary battery of Example 2 was obtained in the same manner as in Example 1 except that the raw material slurry β2 was used instead of the raw material slurry β1.

Example 3

A raw material slurry β3 was obtained by, in Example 1, dispersing, with respect to 95% by mass of the obtained $LiFePO_4$ (LFP) particles, an aqueous polyacrylic acid solution in a solid content of 2.5% by mass as a first carbon source and a water-dispersible phenolic resin in a solid content of 2.5% by mass as a second carbon source in a water solvent.

A positive electrode material for a lithium ion secondary battery of Example 3 was obtained in the same manner as in Example 1 except that the raw material slurry β3 was used instead of the raw material slurry β1.

Comparative Example 1

A raw material slurry β101 was obtained by, in Example 1, dispersing, with respect to 95% by mass of the obtained $LiFePO_4$ (LFP) particles, an aqueous polyacrylic acid solution in a solid content of 5% by mass as a carbon source in a water solvent.

A positive electrode material for a lithium ion secondary battery of Comparative Example 1 was obtained in the same manner as in Example 1 except that the raw material slurry β101 was used instead of the raw material slurry β1.

Comparative Example 2

A raw material slurry β102 was obtained by, in Example 1, dispersing, with respect to 95% by mass of the obtained $LiFePO_4$ (LFP) particles, an aqueous polyacrylic acid solution in a solid content of 1.5% by mass as a first carbon source and a water-dispersible phenolic resin in a solid content of 3.5% by mass as a second carbon source in a water solvent.

A positive electrode material for a lithium ion secondary battery of Comparative Example 2 was obtained in the same manner as in Example 1 except that the raw material slurry β102 was used instead of the raw material slurry β1.

Comparative Example 3

A raw material slurry β103 was obtained by, in Example 1, dispersing, with respect to 95% by mass of the obtained LiFePO$_4$ (LFP) particles, a water-dispersible phenolic resin in a solid content of 5% by mass as a carbon source in a water solvent.

A positive electrode material for a lithium ion secondary battery of Comparative Example 1 was obtained in the same manner as in Example 1 except that the raw material slurry β103 was used instead of the raw material slurry β1.

Example 4

Li$_3$PO$_4$ was used as a Li source and a P source, a FeSO$_4$ aqueous solution was used as a Fe source, a MnSO$_4$ aqueous solution was used as a Mn source, a MgSO$_4$ aqueous solution was used as a Mg source, a CoSO$_4$ aqueous solution was used as a Co source, and a CaSO$_4$ aqueous solution was used as a Ca source, and these were mixed with one another such that the molar ratio (Li:Fe:Mn:Mg:Co:Ca:P) reached 3:0.26:0.7:0.0349:0.05:0.001:1, thereby preparing 2.2 L of a raw material slurry A2.

Next, the raw material slurry A2 was put into a pressure resistant vessel.

After that, a heating reaction of the raw material slurry A2 was caused at 190° C. for 14 hours to carry out hydrothermal synthesis. The pressure in the pressure resistant vessel at this time was 1.0 MPa.

After the reaction, the atmosphere in the pressure resistant vessel was cooled to room temperature to obtain a precipitate of a reaction product in a cake state.

This precipitate was sufficiently washed with distilled water a plurality of times, and the water content was maintained at 40% to prevent the precipitate from being dried, thereby producing a cake-like substance.

This cake-like substance was dried in a vacuum at 70° C. for two hours and, with respect to 96% by mass of the obtained LiFe$_{0.26}$Mn$_{0.7}$Mg$_{0.0349}$Co$_{0.05}$Ca$_{0.001}$PO$_4$ (LFMP) particles, an aqueous polyacrylic acid solution in a solid content of 4.5% by mass as a first carbon source and a water-dispersible phenolic resin in a solid content of 0.5% by mass as a second carbon source were dispersed in a water solvent to obtain a raw material slurry β4.

After the raw material slurry β4 was dried and granulated, a heat treatment was carried out at 715° C. for two hours using a rotary kiln manufactured by Chugai Engineering Co., Ltd. Therefore, the surfaces of particles were coated with a carbonaceous film, and a positive electrode material for a lithium ion secondary battery of Example 4 was obtained.

Hereinafter, the LiFe$_{0.26}$Mn$_{0.7}$Mg$_{0.0349}$Co$_{0.05}$Ca$_{0.001}$PO$_4$ (LFMP) particles will also be referred to as LiFeMnPO$_4$ (LFMP) particles.

Example 5

A raw material slurry β5 was obtained by, in Example 4, dispersing, with respect to 95% by mass of the obtained LiFeMnPO$_4$ (LFMP) particles, an aqueous polyacrylic acid solution in a solid content of 3.5% by mass as a first carbon source and a water-dispersible phenolic resin in a solid content of 1.5% by mass as a second carbon source in a water solvent.

A positive electrode material for a lithium ion secondary battery of Example 5 was obtained in the same manner as in Example 4 except that the raw material slurry β5 was used instead of the raw material slurry β4.

Example 6

A raw material slurry β6 was obtained by, in Example 4, dispersing, with respect to 95% by mass of the obtained LiFeMnPO$_4$ (LFMP) particles, an aqueous polyacrylic acid solution in a solid content of 2.5% by mass as a first carbon source and a water-dispersible phenolic resin in a solid content of 2.5% by mass as a second carbon source in a water solvent.

A positive electrode material for a lithium ion secondary battery of Example 6 was obtained in the same manner as in Example 4 except that the raw material slurry β6 was used instead of the raw material slurry β4.

Comparative Example 4

A raw material slurry β104 was obtained by, in Example 4, dispersing, with respect to 95% by mass of the obtained LiFeMnPO$_4$ (LFMP) particles, an aqueous polyacrylic acid solution in a solid content of 5% by mass as a carbon source in a water solvent.

A positive electrode material for a lithium ion secondary battery of Comparative Example 4 was obtained in the same manner as in Example 4 except that the raw material slurry β104 was used instead of the raw material slurry β4.

Comparative Example 5

A raw material slurry β105 was obtained by, in Example 4, dispersing, with respect to 95% by mass of the obtained LiFeMnPO$_4$ (LFMP) particles, an aqueous polyacrylic acid solution in a solid content of 1.5% by mass as a first carbon source and a water-dispersible phenolic resin in a solid content of 3.5% by mass as a second carbon source in a water solvent.

A positive electrode material for a lithium ion secondary battery of Comparative Example 5 was obtained in the same manner as in Example 4 except that the raw material slurry β105 was used instead of the raw material slurry β4.

Comparative Example 6

A raw material slurry β106 was obtained by, in Example 4, dispersing, with respect to 95% by mass of the obtained LiFeMnPO$_4$ (LFMP) particles, a water-dispersible phenolic resin in a solid content of 5% by mass as a carbon source in a water solvent.

A positive electrode material for a lithium ion secondary battery of Comparative Example 6 was obtained in the same manner as in Example 4 except that the raw material slurry β106 was used instead of the raw material slurry β4.

Production of Lithium Ion Secondary Batteries

The positive electrode material obtained in each of the examples and comparative examples, acetylene black (AB) as a conductive auxiliary agent, and polyvinylidene fluoride (PVdF) as a binder were mixed into N-methyl-2-pyrrolidinone (NMP) in a weight ratio of positive electrode material: AB:PVdF=90:5:5 to produce a positive electrode material paste. The obtained paste was applied onto a 30 μm-thick aluminum foil, dried, and then bonded by pressure to a predetermined density, thereby producing an electrode plate.

The obtained electrode plate was blanked into a plate shape having a 3×3 cm² (coated surface) plus a tab margin, and the tab was welded to produce a test electrode.

Meanwhile, as a counter electrode, a coated electrode that was similarly coated with natural graphite was used. A porous polypropylene film was employed as a separator. In addition, 1 mol/L of a lithium hexafluorophosphate ($LiPF_6$) solution was used as a non-aqueous electrolyte (non-aqueous electrolyte solution). As a solvent that was used in this $LiPF_6$ solution, a solvent obtained by mixing ethylene carbonate and diethyl carbonate in a volume ratio of 1:1 and adding 2% vinylene carbonate thereto as an additive was used.

A laminate-type cell was produced using the test electrode, the counter electrode, and the non-aqueous electrolyte produced as described above and was used as a battery of each of the examples and the comparative examples.

Evaluation of Positive Electrode Materials

For the positive electrode materials obtained in the examples and the comparative examples and the components that the positive electrode materials contained, the physical properties were evaluated. The evaluation methods are as described below. The results are shown in Table 1.

(1) Amount of Carbon (c)

The amount of carbon (c) was measured using a carbon analyzer (manufactured by Horiba, Ltd., model number: EMIA-220V).

(2) Specific Surface Area (a)

The specific surface area (a) was measured by a BET method through nitrogen ($N_2$) adsorption using a specific surface area meter (manufactured by Microtrac BEL Corp., trade name: BELSORP-mini).

The amount of carbon/the specific surface area (c/a) was calculated from the measured amount of carbon (c) and the measured specific surface area (a).

(3) Particle Size Distribution (D50)

The particle size distribution (D50) of the positive electrode material was measured using a laser diffraction/scattering-type particle size distribution measurement instrument (manufactured by Horiba, Ltd., trade name: LA-950).

(4) Tap Density

A sample having a predetermined mass was collected from agglomerated particles of the positive electrode material, and this sample was put into a glass graduated cylinder having a volume of 10 mL. This sample was vibrated together with the graduated cylinder, the volume of the sample was measured when the volume of the sample stopped changing, and a value obtained by dividing the mass of the sample by the volume of the sample was regarded as the tap density of the positive electrode material.

(5) Carbon Filling Rate in Voids (300-Point Average Value)

A thin film sample in which the cross section of a secondary particle of carbonaceous coated positive electrode active material particles was processed was produced using a focused ion beam processing observation device (manufactured by Hitachi High-Tech Corporation, trade name: FB2100), a thin film sample in which the cross section of a secondary particle of an olivine-type phosphate-based compound was processed using a field emission transmission electron microscope (manufactured by Hitachi High-Tech Corporation, trade name: HF2000) was produced, and the carbon filling states in voids between the primary particles were observed. In a void having a diameter of 5 nm or more, the carbon filling rate was calculated from the area ratio between the void and carbon in an observation image. The average value of the carbon filling rates in 300 voids having a diameter of 5 nm or more was calculated and regarded as the carbon filling rate in voids (300-point average value).

Figure 2:
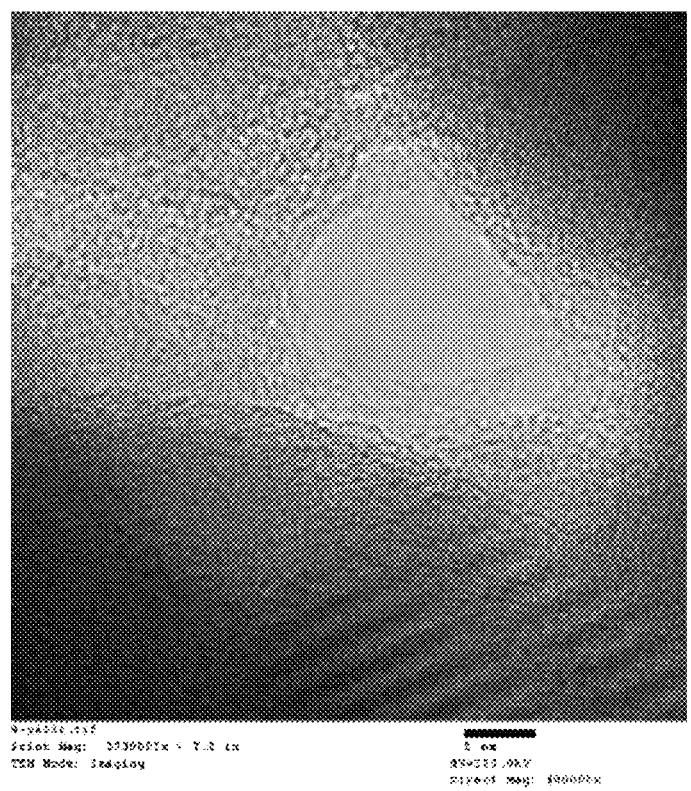
FIG. 2 is a TEM photograph of a positive electrode material for a lithium ion secondary battery in Comparative Example 3.

FIG. 1 shows a transmission electron microscopic (TEM) photograph of the positive electrode material for a lithium ion secondary battery in Example 2, and FIG. 2 shows a TEM photograph of the positive electrode material for a lithium ion secondary battery in Comparative Example 3.

Evaluation of Lithium Ion Secondary Batteries (1) 1C Input Characteristics

The lithium ion secondary batteries were constant-current-charged at current values of 0.1 CA and 1 CA until the voltage of the positive electrode reached, with respect to the voltage of the natural graphite negative electrode at an ambient temperature of 25° C., 4.1 V in the positive electrode materials of Examples 1 to 3 and Comparative Examples 1 to 3 and reached 4.2 V in the positive electrode materials of Examples 4 to 6 and Comparative Examples 4 to 6, and the 1C input characteristics were evaluated from the behaviors using the following standards.

The positive electrode materials of Examples 1 to 3 and Comparative Examples 1 to 3 were evaluated using the following standards.

A: The charge capacity ratio (1 CA/0.1 CA) between 0.1 CA and 1 CA is 0.95 or more.

B: The charge capacity ratio (1 CA/0.1 CA) between 0.1 CA and 1 CA is 0.85 or more and less than 0.95.

C: The charge capacity ratio (1 CA/0.1 CA) between 0.1 CA and 1CA is less than 0.85.

The positive electrode materials of Examples 4 to 6 and Comparative Examples 4 to 6 were evaluated using the following standards.

A: The charge capacity ratio (1 CA/0.1 CA) between 0.1 CA and 1 CA is 0.85 or more.

B: The charge capacity ratio (1 CA/0.1 CA) between 0.1 CA and 1 CA is 0.75 or more and less than 0.85.

C: The charge capacity ratio (1 CA/0.1 CA) between 0.1 CA and 1CA is less than 0.75.

(2) 500 Cycle Service Life Characteristics

The lithium ion secondary batteries were constant-current-charged at a current value of 1 CA until the voltage of the positive electrode reached, with respect to the voltage of the natural graphite negative electrode at an ambient temperature of 45° C., 4.1 V in the positive electrode materials of Examples 1 to 3 and Comparative Examples 1 to 3 and reached 4.2 V in the positive electrode materials of Examples 4 to 6 and Comparative Examples 4 to 6, and then lithium ion secondary batteries were constant-voltage-charged until the current value reached 0.1 CA at the reached voltage. Subsequently, the lithium ion secondary batteries were constant-current-discharged at a current value of 1 CA until the voltages of the positive electrodes reached 2.0 V with respect to the voltage of a natural graphite negative electrode, and the discharge capacities were evaluated. These charging and discharging were repeated 500 times, and the 500 cycle service life characteristics were evaluated using the following standards from the behaviors in the initial discharging and in the $500^{th}$ discharging.

The positive electrode materials of Examples 1 to 3 and Comparative Examples 1 to 3 were evaluated using the following standards.

A: The ratio of the $500^{th}$ discharge capacity to the initial discharge capacity ($500^{th}/1^{st}$) is 0.9 or more.

B: The ratio of the 500th discharge capacity to the initial discharge capacity ($500^{th}/1^{st}$) is 0.8 or more and less than 0.9.

C: The ratio of the 500$^{th}$ discharge capacity to the initial discharge capacity (500$^{th}$/1$^{st}$) is less than 0.8.

The positive electrode materials of Examples 4 to 6 and Comparative Examples 4 to 6 were evaluated using the following standards.

A: The ratio of the 500$^{th}$ discharge capacity to the initial discharge capacity (500$^{th}$/1$^{st}$) is 0.85 or more.

B: The ratio of the 500$^{th}$ discharge capacity to the initial discharge capacity (500$^{th}$/1$^{st}$) is 0.75 or more and less than 0.85.

C: The ratio of the 500$^{th}$ discharge capacity to the initial discharge capacity (500$^{th}$/1$^{st}$) is less than 0.75.

TABLE 1

| | Positive electrode active material | Amount of carbon (c) % by mass | Specific surface area (a) [m$^2$/g] | Amount of carbon/specific surface area (c/a) | D50 [μm] | Tap density [g/cc] | Carbon filling rate in voids (300-point average value [%]) | 1C input characteristics | 500 cycle service life characteristics |
|---|---|---|---|---|---|---|---|---|---|
| Example 1 | LiFePO$_4$ | 1.17 | 10.4 | 0.113 | 6.8 | 1.45 | 34.7 | A | B |
| Example 2 | LiFePO$_4$ | 1.24 | 11.1 | 0.112 | 7.0 | 1.47 | 50.7 | A | A |
| Example 3 | LiFePO$_4$ | 1.37 | 10.9 | 0.126 | 7.9 | 1.49 | 66.3 | B | A |
| Comparative Example 1 | LiFePO$_4$ | 1.04 | 11.5 | 0.090 | 6.5 | 1.39 | 25.4 | A | C |
| Comparative Example 2 | LiFePO$_4$ | 1.51 | 11.2 | 0.135 | 8.1 | 1.50 | 74.9 | C | A |
| Comparative Example 3 | LiFePO$_4$ | 1.72 | 11.7 | 0.147 | 8.4 | 1.52 | 87.3 | C | B |
| Example 4 | LiFe$_{0.26}$Mn$_{0.7}$Mg$_{0.0349}$Co$_{0.05}$Ca$_{0.001}$PO$_4$ | 2.21 | 21.5 | 0.103 | 7.4 | 1.21 | 32.2 | A | B |
| Example 5 | LiFe$_{0.26}$Mn$_{0.7}$Mg$_{0.0349}$Co$_{0.05}$Ca$_{0.001}$PO$_4$ | 2.34 | 20.6 | 0.114 | 7.2 | 1.23 | 49.9 | A | A |
| Example 6 | LiFe$_{0.26}$Mn$_{0.7}$Mg$_{0.0349}$Co$_{0.05}$Ca$_{0.001}$PO$_4$ | 2.29 | 21.8 | 0.105 | 8.1 | 1.23 | 61.1 | B | A |
| Comparative Example 4 | LiFe$_{0.26}$Mn$_{0.7}$Mg$_{0.0349}$Co$_{0.05}$Ca$_{0.001}$PO$_4$ | 1.98 | 21.8 | 0.091 | 7.2 | 1.16 | 22.8 | A | C |
| Comparative Example 5 | LiFe$_{0.26}$Mn$_{0.7}$Mg$_{0.0349}$Co$_{0.05}$Ca$_{0.001}$PO$_4$ | 2.75 | 20.9 | 0.132 | 8.7 | 1.27 | 75.7 | C | A |
| Comparative Example 6 | LiFe$_{0.26}$Mn$_{0.7}$Mg$_{0.0349}$Co$_{0.05}$Ca$_{0.001}$PO$_4$ | 2.99 | 22.4 | 0.133 | 9.4 | 1.26 | 84.6 | C | B |

SUMMARY OF RESULTS

As is clear from Table 1, when the carbon filling rate in voids is small, there is a tendency that the mobility of the electrolyte (also referred to as iontophoresis) is favorable and the 1C input characteristics improve. In addition, when the carbon filling rate in voids is large, the mobility of the electrolyte decreases, and the 1C input characteristics degrade, but the connection between carbon atoms is favorable, and thus it is easy to build a conduction path, and there is a tendency that the cycle characteristics improve.

It was found that the lithium ion secondary batteries obtained from the positive electrode materials of the examples in which the carbon filling rate in the present invention was 30% to 70% obtained the evaluation results of Δ or ○ for both the input characteristics and the cycle characteristics and were excellent in terms of the high input characteristics and the cycle characteristics.

On the other hand, the lithium ion secondary batteries obtained from the positive electrode materials of the comparative examples in which the carbon filling rate in the present invention was not in the range of 30% to 70% were evaluated as X for any one of the input characteristics and the cycle characteristics.

The positive electrode material for a lithium ion secondary battery of the present invention is useful as a positive electrode of a lithium ion secondary battery.

What is claimed is:

1. A positive electrode material for a lithium ion secondary battery comprising:
an olivine-type phosphate-based compound represented by General Formula Li$_x$A$_y$D$_z$PO$_4$; and
carbon,
wherein, in transmission electron microscopic observation of a cross section of a secondary particle that is an agglomerate of primary particles of the olivine-type phosphate-based compound, a 300-point average value of filling rates of the carbon that fills insides of voids having a diameter of 5 nm or larger that are formed by the primary particles is 30 to 70%,
wherein a value (c/a) obtained by dividing the amount of carbon (c) by a specific surface area (a) is 0.07 to 0.14,
wherein a tap density is 1.0 to 1.6 g/cm$^3$, and
wherein, in the general formula, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, and x, y, and z satisfy 0.9<x<1.1, 0<y≤1.0, 0≤z<1.0, and 0.9<y+z<1.1.

2. The positive electrode material for a lithium ion secondary battery according to claim 1,
wherein the amount of carbon (c) is 0.7% to 3.0% by mass, and
the specific surface area (a) is 5 to 35 m$^2$/g.

3. A positive electrode for a lithium ion secondary battery, comprising:
an electrode current collector; and
a positive electrode mixture layer formed on the electrode current collector,
wherein the positive electrode mixture layer contains the positive electrode material for a lithium ion secondary battery according to claim 1.

4. A lithium ion secondary battery comprising:
a positive electrode;
a negative electrode; and
an electrolyte,
wherein the positive electrode for a lithium ion secondary battery according to claim 3 is provided as the positive electrode.

* * * * *